United States Patent
Gardner et al.

(10) Patent No.: US 10,640,069 B2
(45) Date of Patent: May 5, 2020

(54) PARTITION

(71) Applicant: Quality Plastics, Inc., Sparks, NV (US)

(72) Inventors: Guy Gardner, Reno, NV (US); Jacob Yardley, Reno, NV (US); Jim Carrick, Reno, NV (US)

(73) Assignee: Quality Plastics, Inc., Sparks, NV (US)

(*) Notice: Subject to any disclaimer, the term of this patent is extended or adjusted under 35 U.S.C. 154(b) by 67 days.

(21) Appl. No.: 16/015,674

(22) Filed: Jun. 22, 2018

(65) Prior Publication Data

US 2019/0001911 A1    Jan. 3, 2019

Related U.S. Application Data

(60) Provisional application No. 62/526,789, filed on Jun. 29, 2017.

(51) Int. Cl.
  *B60R 21/12* (2006.01)
  *B60P 3/03* (2006.01)
(52) U.S. Cl.
  CPC ............ *B60R 21/12* (2013.01); *B60P 3/03* (2013.01)
(58) Field of Classification Search
  CPC .................................. B60R 21/12; B60P 3/03
  See application file for complete search history.

(56) References Cited

U.S. PATENT DOCUMENTS

| | | |
|---|---|---|
| 3,855,898 A | 12/1974 | McDonald |
| 4,696,848 A | 9/1987 | Jones et al. |
| 4,706,775 A | 11/1987 | Berg |
| 4,949,508 A | 8/1990 | Elton |
| 5,090,762 A | 2/1992 | Krieger |
| 5,438,908 A | 8/1995 | Madden, Jr. |
| 5,735,564 A * | 4/1998 | Coogan ............... B60R 21/026 280/748 |
| 5,811,719 A | 9/1998 | Madden, Jr. |
| 5,820,191 A | 10/1998 | Blakewood, Jr. et al. |
| 6,092,858 A | 7/2000 | Bolwell |
| 6,158,789 A | 12/2000 | Fett et al. |
| 6,626,477 B2 | 9/2003 | Maynard et al. |

(Continued)

OTHER PUBLICATIONS

Setina Manufacturing Inc.; Replacement Seat Installation Instructions; 2013; 8 pages.

*Primary Examiner* — Lori I Lyjak
(74) *Attorney, Agent, or Firm* — Lowe Graham Jones PLLC

(57) ABSTRACT

A partition is formed with a thermoformed panel having a front side, a rear side, a driver-side portion, a passenger-side portion, and a gun well positioned between the driver-side portion and the passenger-side portion. The gun well is recessed toward the rear side of the thermoformed panel. The driver-side portion is sized and dimensioned to extend along a majority of a vertical height of a driver-side seat of a vehicle. The driver-side portion is formed with a driver-side seatback transitional surface transitioning from the driver-side portion toward the gun well. The driver-side seatback transitional surface is tangentially angled and non-squared. The passenger-side portion is formed with a passenger-side seatback transitional surface transitioning from the passenger-side portion toward the gun well. The passenger-side seatback transitional surface is tangentially angled and non-squared.

20 Claims, 14 Drawing Sheets

(56) References Cited

U.S. PATENT DOCUMENTS

| | | | |
|---|---|---|---|
| 6,926,341 B1 | 8/2005 | Adesso et al. | |
| 7,052,069 B2 | 5/2006 | Vance et al. | |
| 7,686,379 B2 | 3/2010 | Lemieux | |
| 8,615,932 B2 | 12/2013 | Setina | |
| 8,708,388 B2* | 4/2014 | Setina | B60R 21/12 |
| | | | 296/24.4 |
| 9,090,216 B2 | 7/2015 | Setina | |
| 10,183,643 B2* | 1/2019 | Paunov | B60R 21/026 |
| 2002/0017802 A1 | 2/2002 | Edwards | |
| 2004/0134626 A1 | 7/2004 | Murray et al. | |
| 2009/0151827 A1 | 6/2009 | Thompson | |
| 2013/0113232 A1* | 5/2013 | Sage | B60R 21/12 |
| | | | 296/24.46 |
| 2013/0147221 A1* | 6/2013 | Setina | B60R 21/12 |
| | | | 296/24.42 |
| 2017/0355338 A1* | 12/2017 | Paunov | B60R 21/026 |

\* cited by examiner

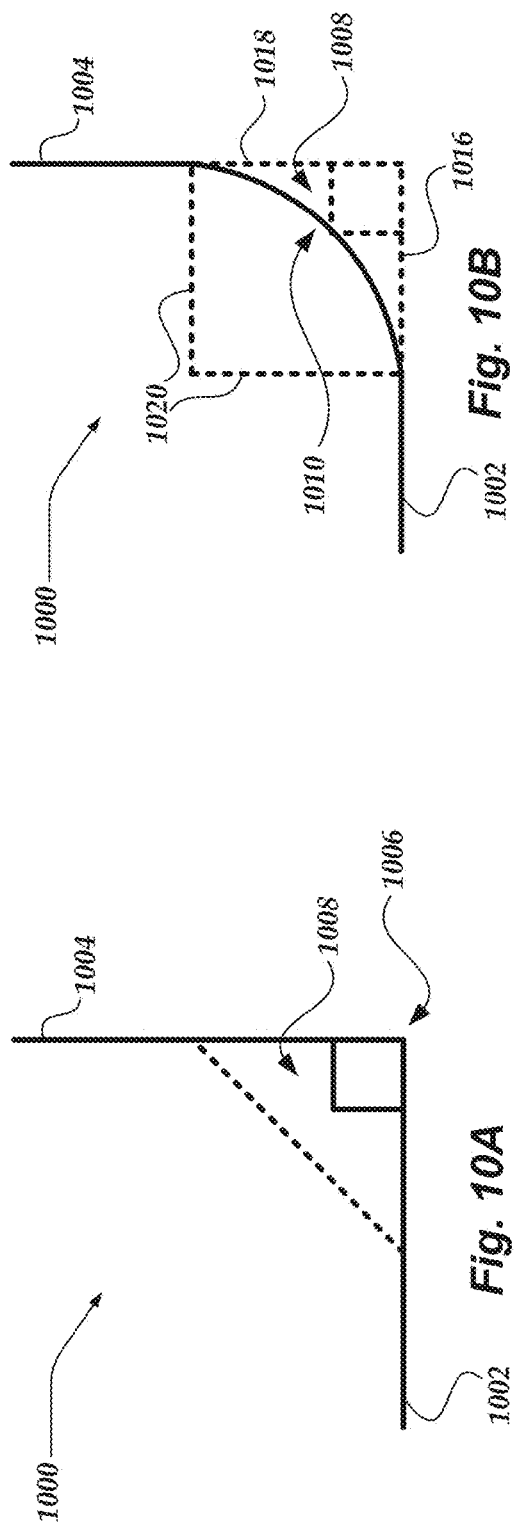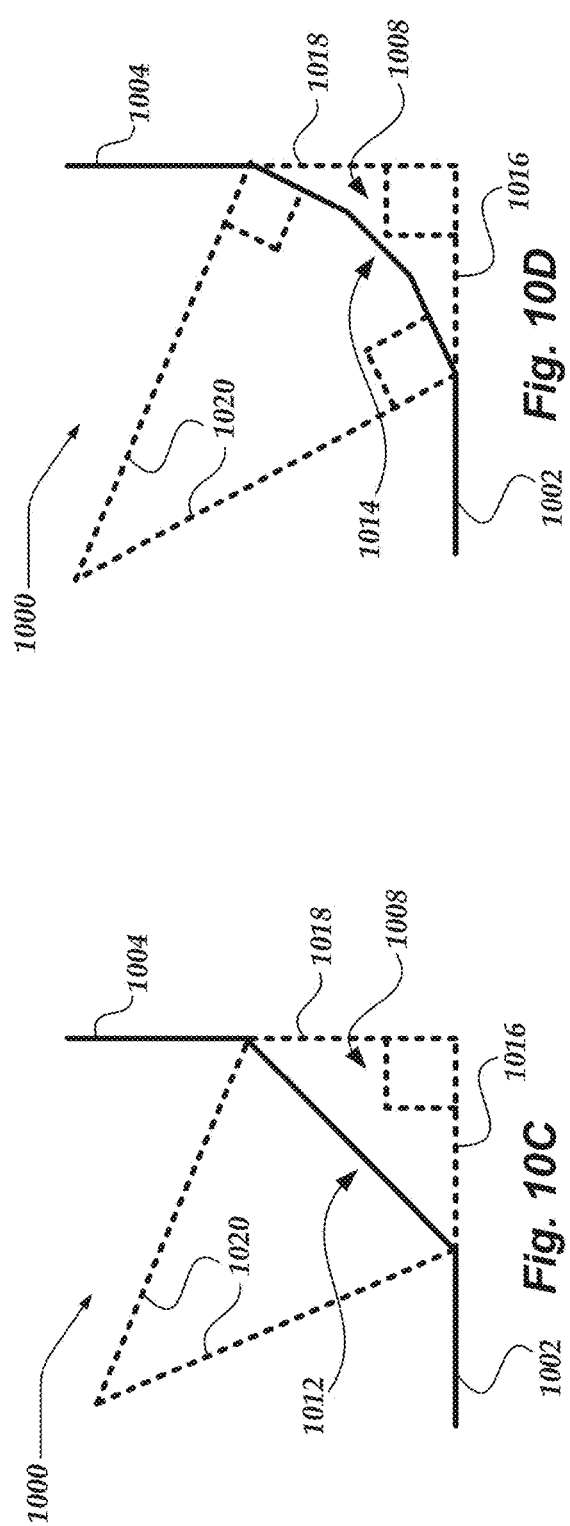

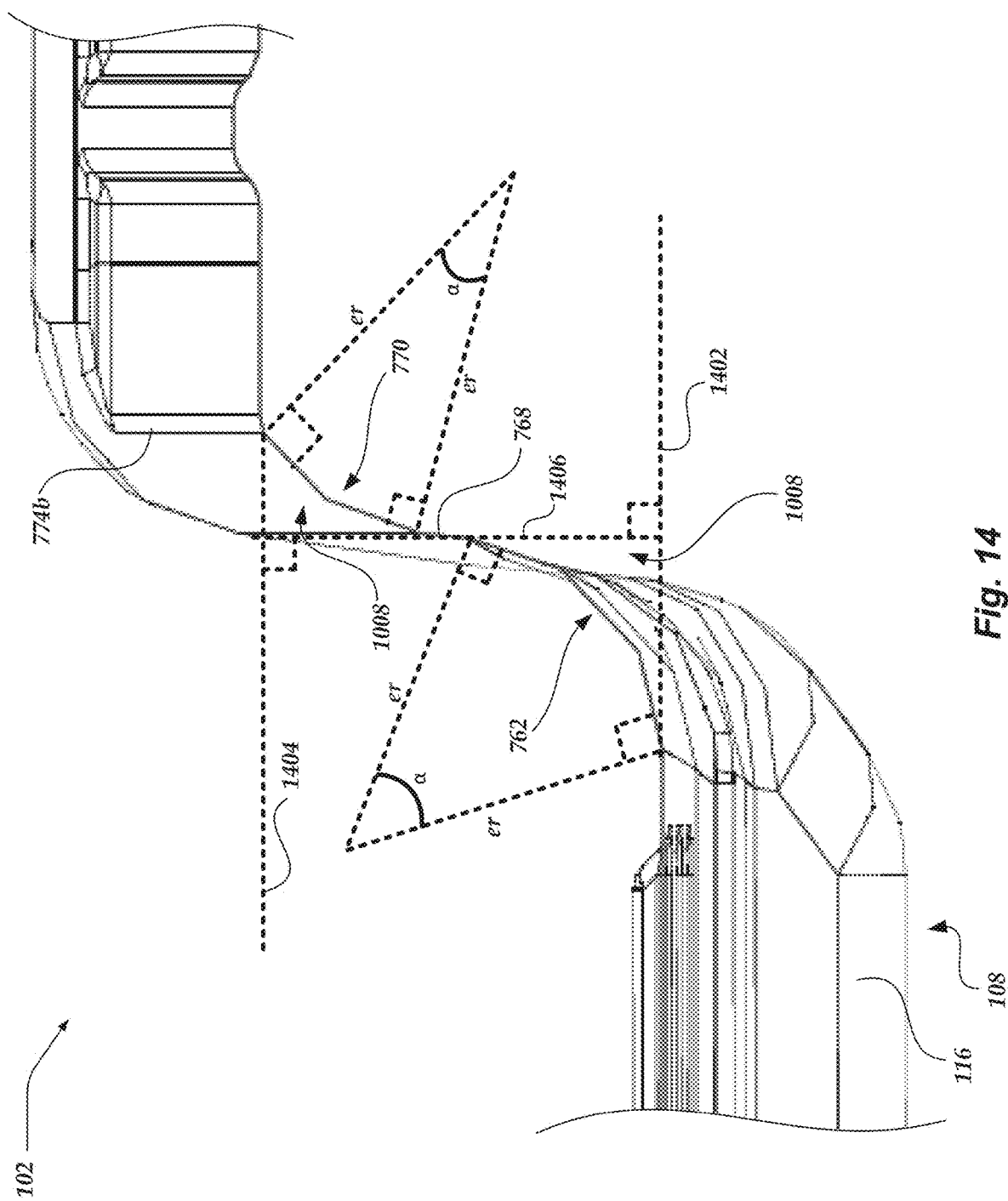

PARTITION

CROSS REFERENCE TO RELATED APPLICATION

This application claims the benefit of U.S. Provisional Patent Application No. 62/526,789, filed Jun. 29, 2017, the contents of which are hereby incorporated by reference.

FIELD OF THE INVENTION

The present invention relates to partitions for vehicles, such as police vehicles that may transport prisoners.

BACKGROUND OF THE INVENTION

Police vehicles, such as police pursuit vehicles (PPVs), are often used to transport prisoners. In PPVs, the prisoner typically sits in the back seat, and a partition between the back seat and the front seats prevents the prisoner from reaching officers in the front seats. The partition traditionally has a metal framework with a window in the upper region and a set of metal panels within the metal framework in the lower region. The panels and frame are heavy, made from multiple pieces, and have a tendency to rattle. The partition often properly fits in only one vehicle model because different vehicle models usually have different interior shapes, dimensions, and components.

SUMMARY OF THE INVENTION

In a preferred version of the invention, a partition is formed with a thermoformed panel having a front side, a rear side, a driver-side portion, a passenger-side portion, and a gun well positioned between the driver-side portion and the passenger-side portion. The gun well is recessed toward the rear side of the thermoformed panel. The driver-side portion is sized and dimensioned to extend along a majority of a vertical height of a driver-side seat of a vehicle. The driver-side portion is formed with a driver-side seatback transitional surface transitioning from the driver-side portion toward the gun well. The driver-side seatback transitional surface is tangentially angled and non-squared. The passenger-side portion is formed with a passenger-side seatback transitional surface transitioning from the passenger-side portion toward the gun well. The passenger-side seatback transitional surface is tangentially angled and non-squared.

In one example, the thermoformed panel has only one molded sheet.

In one version, the gun well is formed with a driver-side gun-well transitional surface transitioning from the gun well toward the driver-side portion. In some examples, the driver-side gun-well transitional surface is tangentially angled and non-squared.

The gun well may be formed with a passenger-side gun-well transitional surface transitioning from the gun well to the passenger-side portion. Preferably, the passenger-side gun-well transitional surface is tangentially angled and non-squared.

In one version, the gun well has one or more mounting surfaces configured to receive one or more accessories.

In one example, the partition has a top frame disposed above the thermoformed panel. The thermoformed panel has a lateral width, and the top frame preferably extends along the lateral width of the thermoformed panel. The thermoformed panel may extend from a floor of the vehicle to the top frame.

In some versions, one or more of the driver-side seatback transitional surface or the passenger-side seatback transitional surface has a chamfer.

In some examples, one or more of the driver-side seatback transitional surface or the passenger-side seatback transitional surface has a multi-faceted chamfer.

Preferably, one or more of the driver-side seatback transitional surface or the passenger-side seatback transitional surface is radiused.

Most preferably, the driver-side portion and the passenger-side portion extend forward relative to the gun well by different longitudinal distances.

In some versions, one or more of the driver-side gun-well transitional surface or the passenger-side gun-well transitional surface has a chamfer.

In some examples, one or more of the driver-side gun-well transitional surface or the passenger-side gun-well transitional surface has a multi-faceted chamfer.

Preferably, one or more of the driver-side gun-well transitional surface or the passenger-side gun-well transitional surface is radiused.

BRIEF DESCRIPTION OF THE DRAWINGS

Preferred and alternative examples of the present invention are described in detail below with reference to the following drawings.

FIG. 10A is a top sectional view of a junction of a first panel portion and a second panel portion that meet each other at a sharp edge.

FIG. 10B is a top sectional view of a junction of a first panel portion and a second panel portion, with a radiused transitional surface that extends from the first panel portion to the second panel portion.

FIG. 10C is a top sectional view of a junction of a first panel portion and a second panel portion, with a chamfered transitional surface that extends from the first panel portion to the second panel portion.

FIG. 10D is a top sectional view of a junction of a first panel portion and a second panel portion, with a multi-chamfered transitional surface that extends from the first panel portion to the second panel portion.

FIG. 14 is a close-up partial view of FIG. 8, which is a top sectional view of a portion of a partition, taken through section 7-7 of FIG. 1, showing tangentially angled features of a preferred panel.

DETAILED DESCRIPTION OF THE PREFERRED EMBODIMENT

Figure 1:
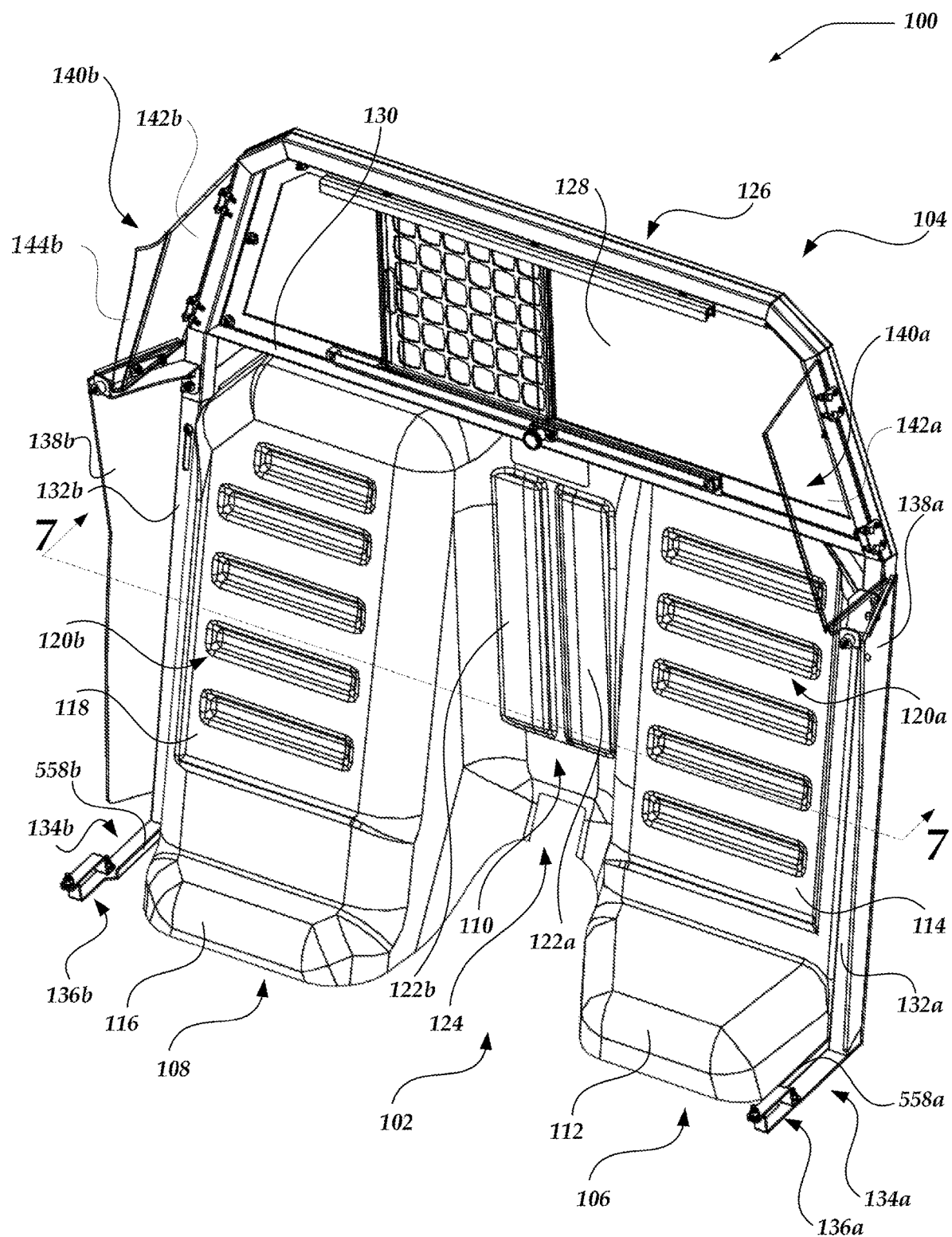
FIG. 1 is a front isometric view of a partition, including a preferred panel and a preferred frame.
Figure 2:
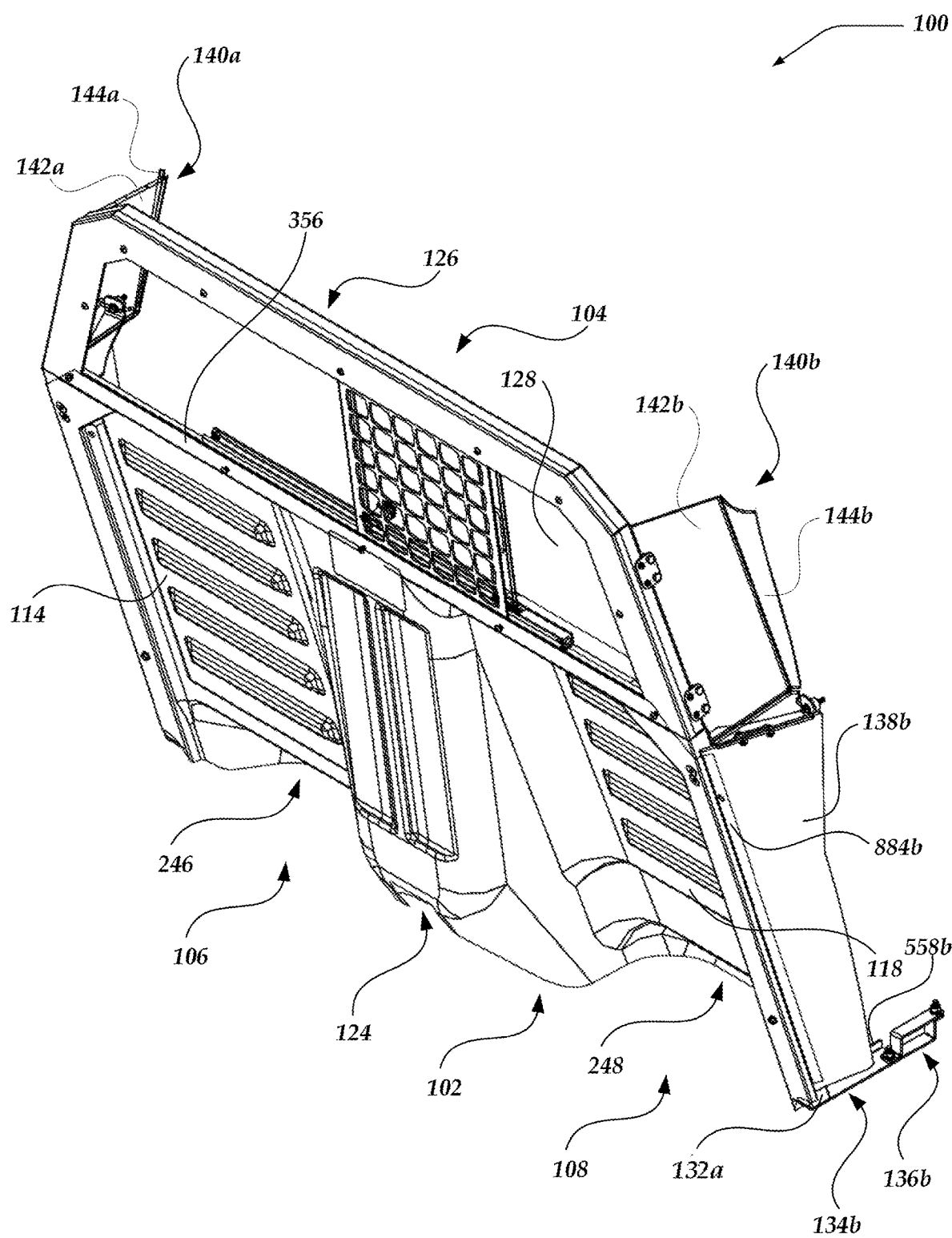
FIG. 2 is a rear isometric view of a partition, including a preferred panel and a preferred frame.

An example of a partition 100 for a vehicle, such as a police pursuit vehicle (PPV), is illustrated in front and rear views in FIGS. 1 and 2 and includes a preferred panel 102 and a preferred frame 104. In some examples, the panel 102 includes one or more molded sheets of thermoplastic polymer, such as acrylonitrile butadiene styrene (ABS) plastic or others. Preferably, the molded sheet is formed by thermoforming (for example, vacuum forming or others). Most preferably, the panel 102 includes only one molded sheet. Accordingly, the panel 102 facilitates providing a lighter weight partition 100 compared to other partitions. Also accordingly, the panel 102 can be formed to contour the interior components of the vehicle, thereby facilitating providing increased usable space in the vehicle compared to other partitions. Moreover, because the panel 102 may include only one sheet, the panel 102 facilitates providing reduced noise compared to other partitions and facilitates reducing installation time compared to other partitions.

In the example illustrated in FIGS. 1 and 2, the panel 102 has a driver-side portion 106, a passenger-side portion 108, and a gun well 110 that is disposed between the driver-side portion 106 and the passenger-side portion 108. In some examples, the driver-side portion 106 may be on the left side while the passenger-side portion 108 is on the right side (for example, when implemented in vehicles intended for use in England, in mail delivery vehicles in the United States, or others). Preferably, the driver-side portion 106 has a forward-extending shell 112 disposed below a driver-side panel portion 114, which is configured to extend below a front seat, and which forms a portion of a first rear-seat footwell (see footwell 246 in FIG. 2). In some examples, the panel portion 114 may conform to the shape of the back of the driver-side seat of the vehicle. Preferably, the passenger-side portion 108 has a forward-extending shell 116 disposed below a passenger-side panel portion 118, forming a portion of a second rear-seat footwell (see footwell 248 in FIG. 2). In some examples, the panel portion 118 may conform to the shape of the back of the passenger-side seat of the vehicle. As shown in FIG. 1, the panel portion 114 may have one or more raised or lowered ridges, ribs, or cavities 120a to enhance structural rigidity of the panel 102. The panel portion 118 may have one or more raised or lowered ridges, ribs, or cavities 120b to enhance structural rigidity of the panel 102.

As shown in FIGS. 1 and 2, the gun well 110 is recessed relative to the driver-side panel portion 114 and relative to the passenger-side panel portion 118 (as used here, "recessed" is a depression in a direction from the front side of the panel 102, as seen in FIG. 1, toward the rear side, visible in FIG. 2). In the example of FIGS. 1 and 2, the passenger-side panel portion 118 is positioned farther forward than the driver-side panel portion 114, thereby facilitating the driver seat sliding fully backward to increase driver comfort while providing increased prisoner space behind the passenger seat. In some examples, the shell 112 extends forward by the same distance relative to the gun well 110 as the shell 116, thereby accommodating transporting prisoners with the same shoe size behind either the driver or passenger seats (see, for example, the driver-side footwell 246 defined by the shell 112 and the passenger-side footwell 248 defined by the shell 116 in FIG. 2). Preferably, the gun well 110 includes one or more mounting surfaces (for example, one or more raised platforms or others), such as driver-side mounting surface 122a and passenger-side mounting surface 122b, that facilitate securing one or more accessories (for example, one or more firearm racks, weapons such as firearms, or others) to the panel 102. In the illustrated example, the mounting surfaces 122a, 122b are provided in the form of a pair of parallel generally rectangular planar surfaces in which the rectangles have a height (in the direction from the floor of the vehicle toward the ceiling of the vehicle) which is greater than the width (in a direction from the driver side to the passenger side). In some examples, the gun well 110 has a recess 124 that is sized and dimensioned to receive one or more protruding features or components in the vehicle, such as a drive-shaft hump or an electrical conduit channel that runs along the longitudinal length of some vehicles.

In some examples, the frame 104 has a top frame 126 that encompasses an upper panel 128. Preferably, the upper panel 128 has one or more displaceable portions (for example, one or more laterally slidable windows, mesh panels such as a Chicago-style partition, or others) that facilitate selective communication through the partition 100. In some examples, the upper panel 128 is transparent, and it may be formed as a single unitary panel without any sliding or displaceable portions. In preferred examples, the laterally outer portions of the top frame 126 are not coupled to a portion of the vehicle, and instead are separated from but positioned close to a vehicle ceiling and a pillar between front and rear doors of the vehicle (for example, a B pillar or others). In other examples, one or more brackets may extend from a portion of the vehicle (for example, a B pillar) and may be bolted to both the portion of the vehicle and the laterally outer portions of the top frame 126, with each bracket extending below a deployed position of a side airbag of the vehicle to permit deploying the air bag. As shown in FIG. 1, the top frame 126 has a bottom bar 130 that couples to the top of the panel 102, for example using bolts, rivets, or other fasteners. Most preferably, the panel 102 extends from the bottom bar 130 to the floor of the vehicle.

In some examples, the frame 104 has one or more side frame members, and preferably including a driver-side frame member 132a and a passenger-side frame member 132b, that extend downward from the top frame 126 to one or more longitudinal plates, such as driver-side longitudinal plate 134a and passenger-side longitudinal plate 134b, that are disposed at the laterally outer edges of the panel 102. Each side frame member may include an upright. Preferably, the panel 102 laterally extends to at least the laterally inner edges of side frame members of the frame 104. In some examples, the side frame members couple to the panel 102. Most preferably, each side frame member is removably coupled to the top frame 126. In some examples, the side frame members are bolted (or riveted, or otherwise fastened) to one or both of the panel 102 and the top frame 126, coupled to one or both of the panel 102 and the top frame 126 with an interference fit, or others.

In a preferred version, the frame 104 and its side members are not attached to the side of the vehicle, thereby accommodating for the use of side curtain airbags. In other examples, one or more side frame members, such as driver-side frame member 132a or passenger-side member 132b, may be coupled to a portion of the vehicle, such as a pillar between front and rear doors of the vehicle (for example, a B pillar or others). For example, one or more brackets may extend from the portion of the vehicle and may be bolted to both the portion of the vehicle and the one or more side frame members, with each bracket extending below a deployed position of a side airbag of the vehicle to permit deploying the air bag. In some examples, the front end portion of one or more of the driver-side longitudinal plate 134a or the passenger-side longitudinal plate 134b has one or more clamps, such as a driver-side clamp 136a or a passenger-side clamp 136b, that are sized and dimensioned to receive and couple to a portion of the vehicle, such as seat mounting brackets or rails under the driver and passenger seats of the vehicle. In the example of FIG. 1, the driver-side clamp 136a and the passenger-side clamp 136b are secured in the closed configuration with two bolts and corresponding flanged locknuts.

As shown in FIGS. 1 and 2, one or more optional side panels, such as driver-side panel 138a and passenger-side panel 138b, extend forward and laterally outward from the side frame members. Preferably, the front end portion of each side panel contacts or couples to a portion of the vehicle, such as a front end portion of a pillar between front and rear doors of the vehicle (for example, a B pillar or others). As also shown in FIGS. 1 and 2, one or more optional upper side panels, such as upper driver-side panel 140a and upper passenger-side panel 140b, extend forward and laterally outward from the laterally outer edges of the top frame 126. In some examples, each upper side panel has a forward-extending portion and a laterally outward-extending portion. For example, the upper driver-side panel 140a has a driver-side forward-extending portion 142a and a driver-side outward-extending portion 144a, and the upper passenger-side panel 140b has a passenger-side forward-extending portion 142b and a passenger-side outward-extending portion 144b. In some examples, the upper side panels are transparent. Preferably, the bottom end portion of each upper side panel couples to the upper end portion of a corresponding driver-side panel 138a or passenger-side panel 138b. Accordingly, each side panel and each upper side panel impedes prisoners from reaching around the partition 100. Also accordingly, in some examples, each upper side panel provides space for side air bags to deploy while inhibiting a prisoner from reaching around the partition 100. In some examples, one or more side panels or upper side panels may be configured to breakaway or be otherwise displaced upon activation of one or more air bags in or around the pillar of the vehicle. For example, one or more hook-and-loop couplings, magnetic couplings, hingeable couplings, frangible couplings, or others may couple one or more side panels or upper side panels to each other or to the vehicle.

As shown in FIG. 2, a driver-side footwell 246 is defined by the vehicle floor and the shell 112 that extends down to the vehicle floor. As also shown in FIG. 2, a passenger-side footwell 248 is defined by the vehicle floor and the shell 116 that extends down to the floor.

Figure 3:
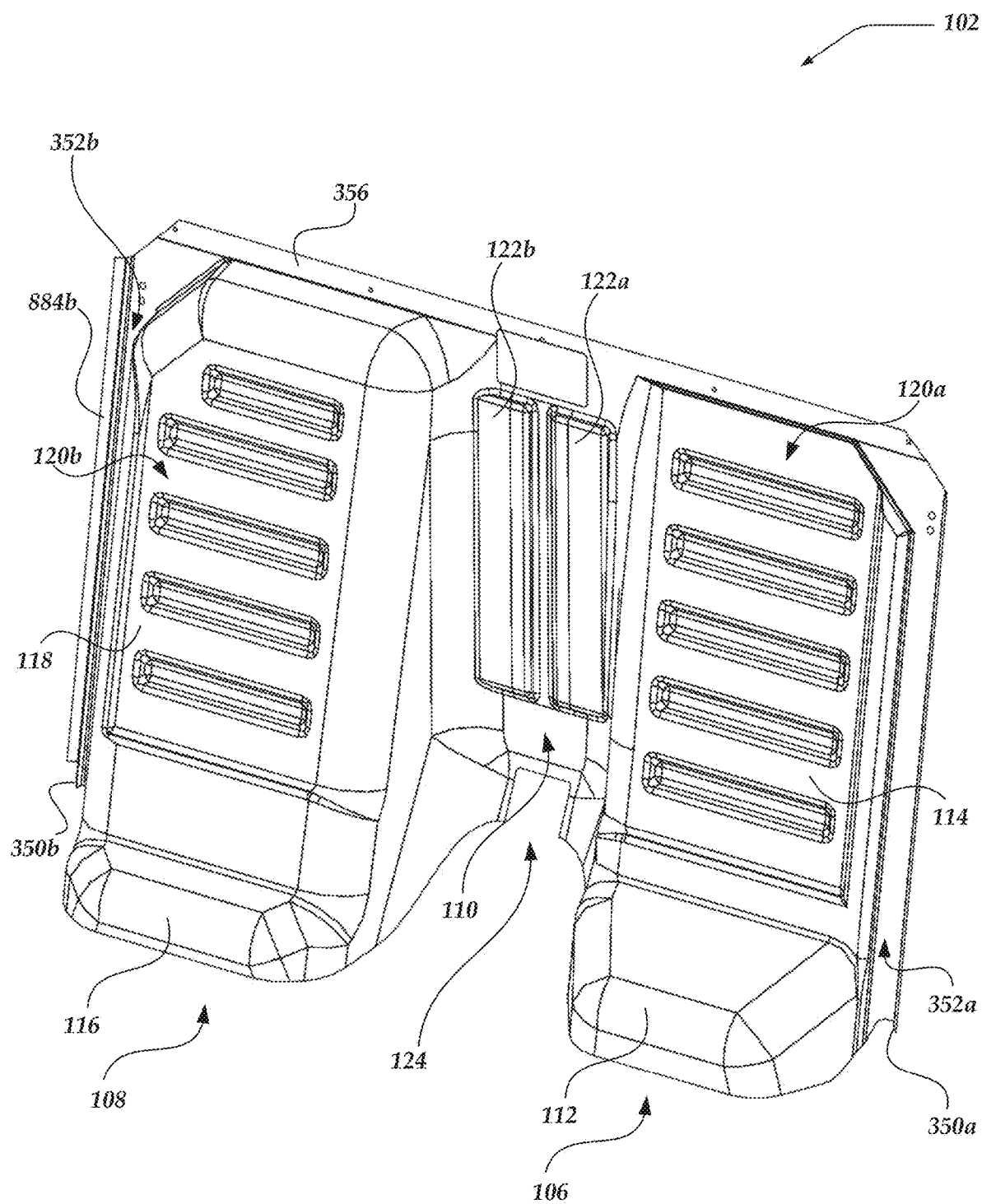
FIG. 3 is a front isometric view of a preferred panel.
Figure 4:
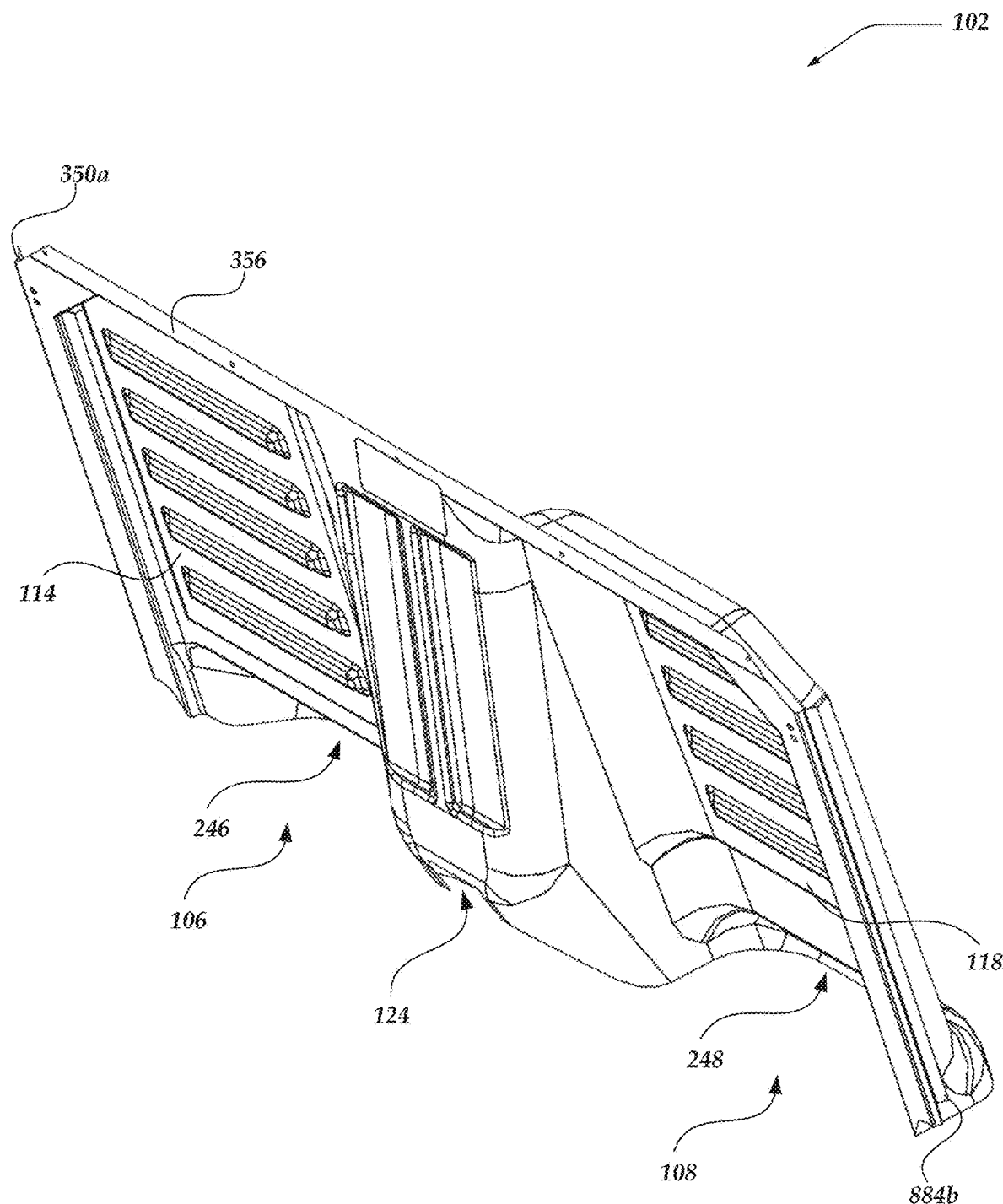
FIG. 4 is a rear isometric view of a preferred panel.

As shown in FIG. 3, the panel 102 has one or more forward-extending flanges, such as a driver-side forward-extending flange 350a and a passenger-side forward-extending flange 350b, disposed at one or both of the laterally outer edges of the panel 102. The forward-extending flange defines a channel, such as a driver-side channel 352a and a passenger-side channel 352b, that is sized and dimensioned to receive the side frame members. As shown in FIGS. 3 and 4, the panel 102 has an upper flange 356 that is sized and dimensioned to receive and couple to the bottom bar 130 of the top frame 126.

Figure 5:
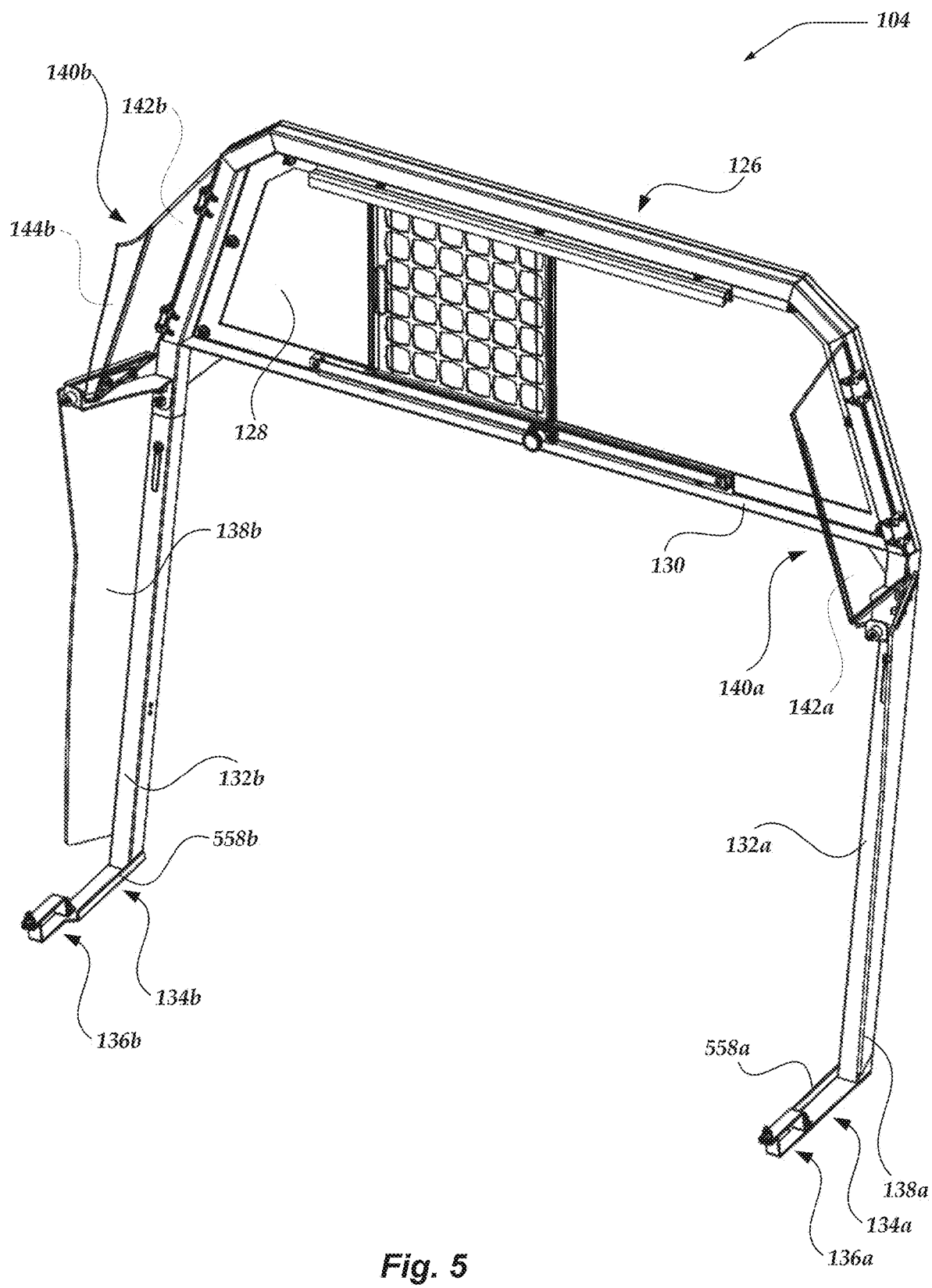
FIG. 5 is a front isometric view of a preferred frame.
Figure 6:
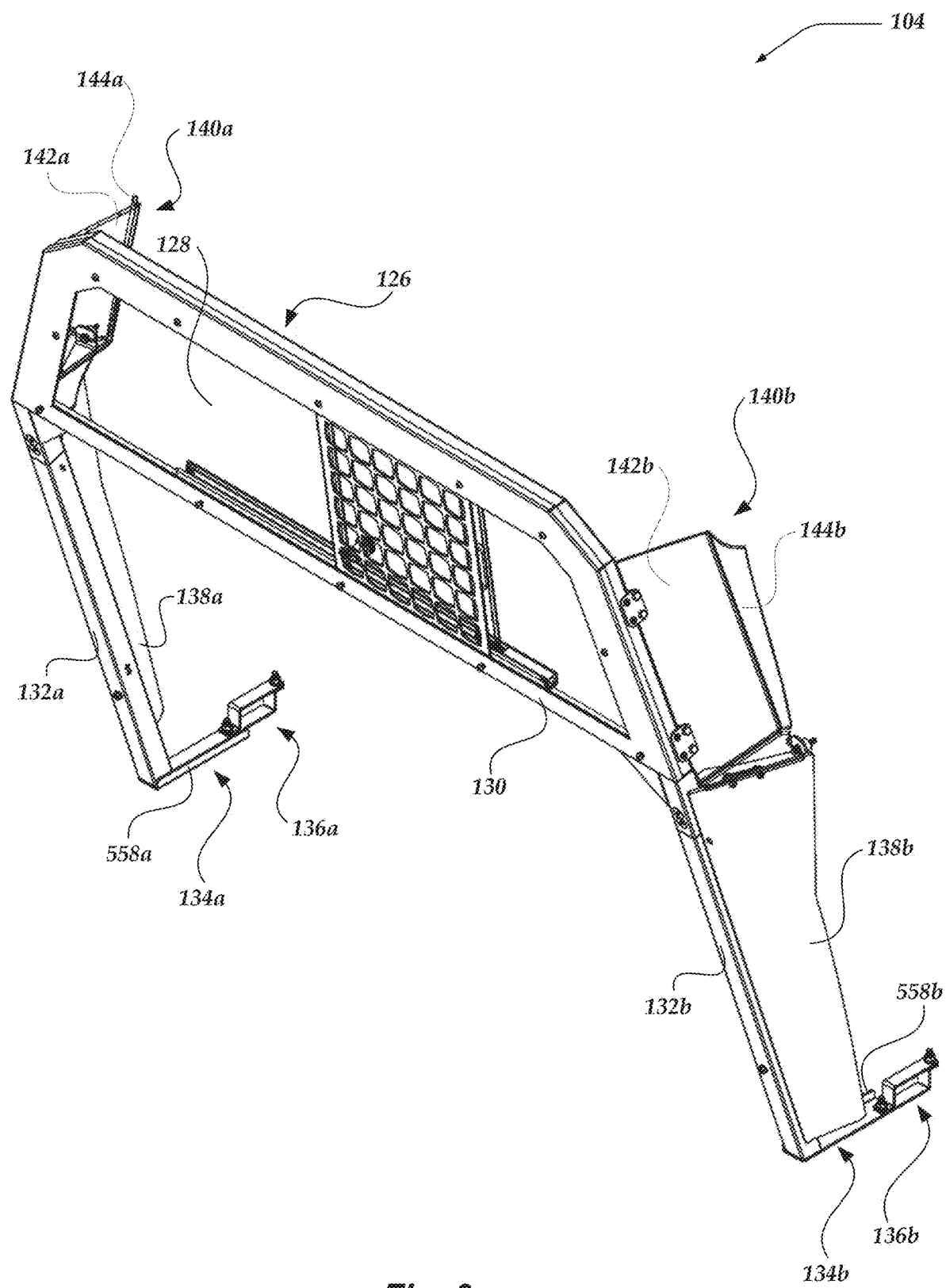
FIG. 6 is a rear isometric view of a preferred frame.

As shown in FIGS. 5 and 6, one or more longitudinal plates, such as the driver-side longitudinal plate 134a or the passenger-side longitudinal plate 134b, has an upward-extending flange, such as a driver-side upward-extending flange 558a and a passenger-side upward-extending flange 558b, that facilitates mounting and attaching the frame 104 to the vehicle and the panel 102 to the frame 104. For example, each longitudinal plate may have an upward-extending member (for example, a metal portion that is sized and dimensioned to match the internal shape and dimension of the bottom end portion of each corresponding side frame member) that is received in the bottom end portion of each corresponding side frame member and, in combination with a downward force applied to the frame 104 by the roof of the vehicle, keeps the frame 104 from moving relative to the longitudinal plate. As also shown in FIGS. 5 and 6, one or more side panels or upper side panels couple directly to the frame 104.

Figure 7:
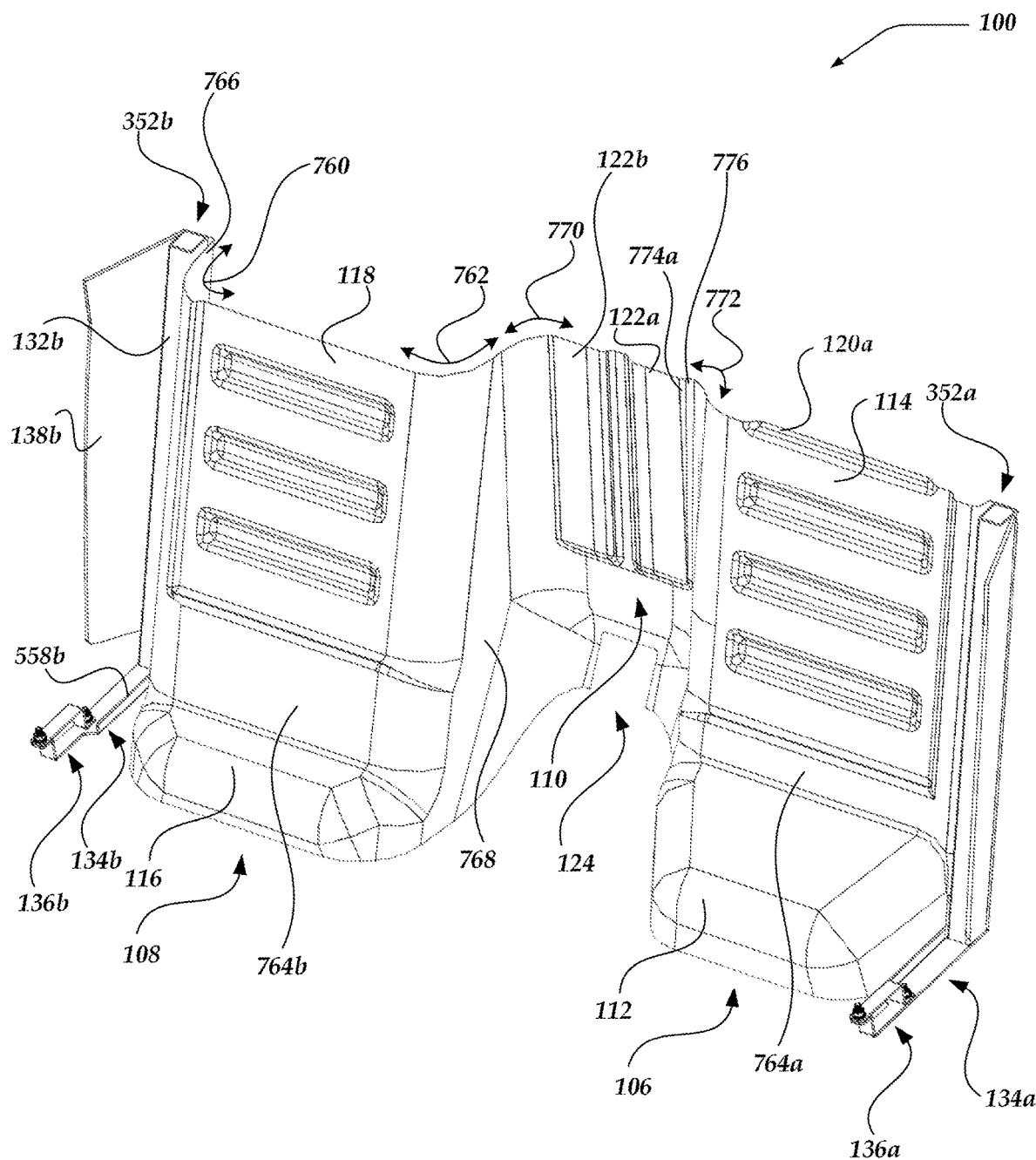
FIG. 7 is a front sectional view of a partition, taken through section 7-7 of FIG. 1, showing tangentially angled features of a preferred panel.
Figure 8:
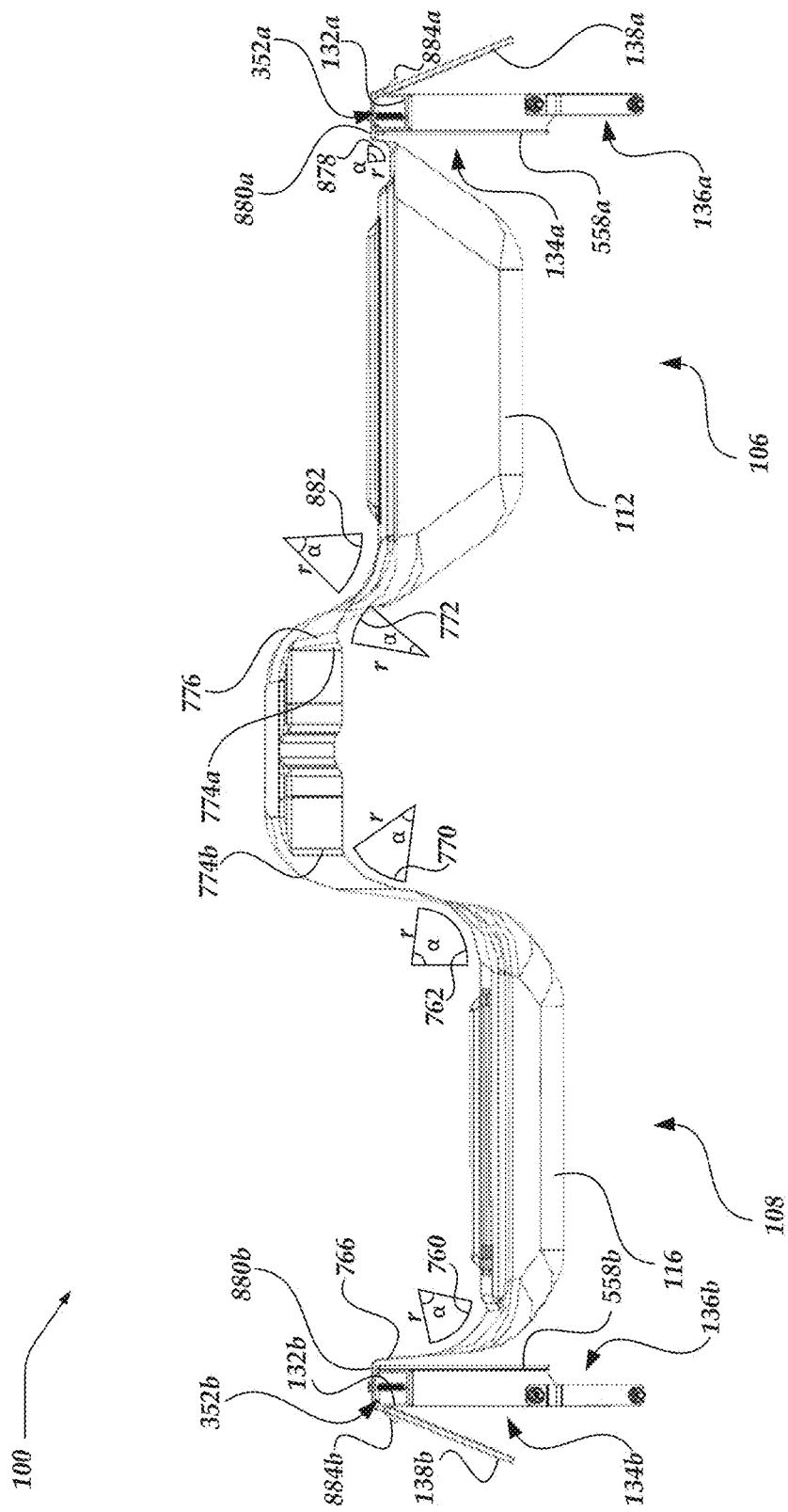
FIG. 8 is a top sectional view of a partition, taken through section 7-7 of FIG. 1, showing tangentially angled features of a preferred panel.

In some examples, as seen in sectional views of the partition 100 in FIGS. 7 and 8 taken along the plane 7-7 in FIG. 1, one or more transitional surfaces of the panel 102 are tangentially angled. As used herein, the term "transitional surface" or derivatives thereof refers to a surface that extends from a first surface of the panel 102 to a second surface of the panel 102. The first and second surfaces extend in directions that are transverse to one another and may lie generally in planes that are transverse or even perpendicular to one another, although the first and second surfaces themselves may have curvatures and undulations such that they are not flat and do not fully lie in a plane. In one example as illustrated in FIG. 7, the second surface is perpendicular or nearly perpendicular (for example, within 7° of perpendicular) to the first surface. A transitional surface has a length that extends along a face of the transitional surface from the first surface to the second surface and in a plane that is perpendicular to the first surface and to the second surface. The transitional surface is transverse to and offset from both the plane in which the first surface generally lies and the plane in which the second surface generally lies. Typically, the transitional surface does not intersect the plane in which the first surface generally lies and does not intersect the plane in which the second surface generally lies. Accordingly, the length begins with the first point that deviates from the plane in which the first surface generally lies and ends with the last point that deviates from the plane in which the second plane generally lies. Preferably, the length of each transitional surface is at least one inch. In some examples, the second surface is the beginning portion (or end portion) of another transitional surface.

Figure 11:
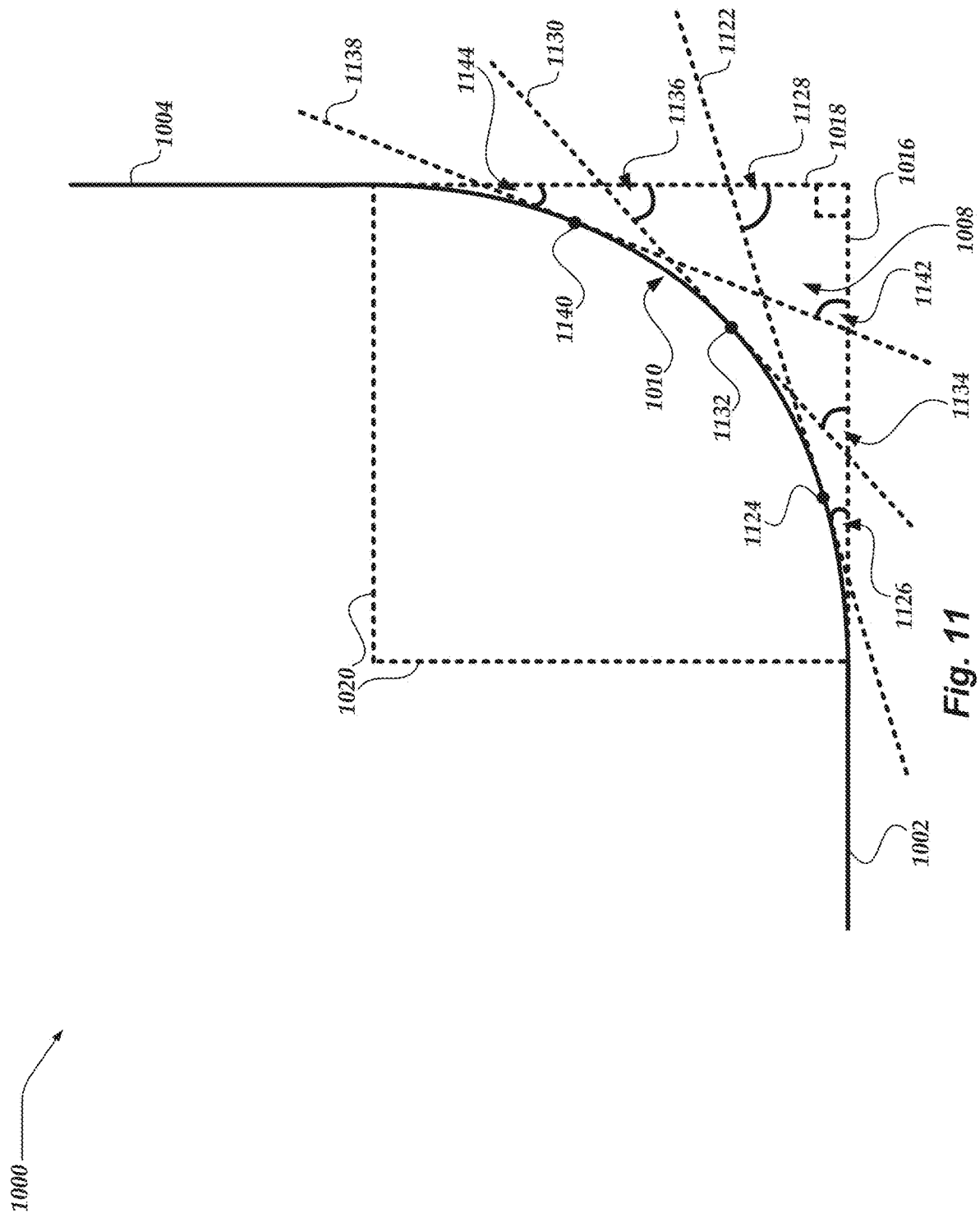
FIG. 11 is a top sectional view of a junction of a first panel portion and a second panel portion, with a radiused transitional surface that extends from the first panel portion to the second panel portion.
Figure 12:
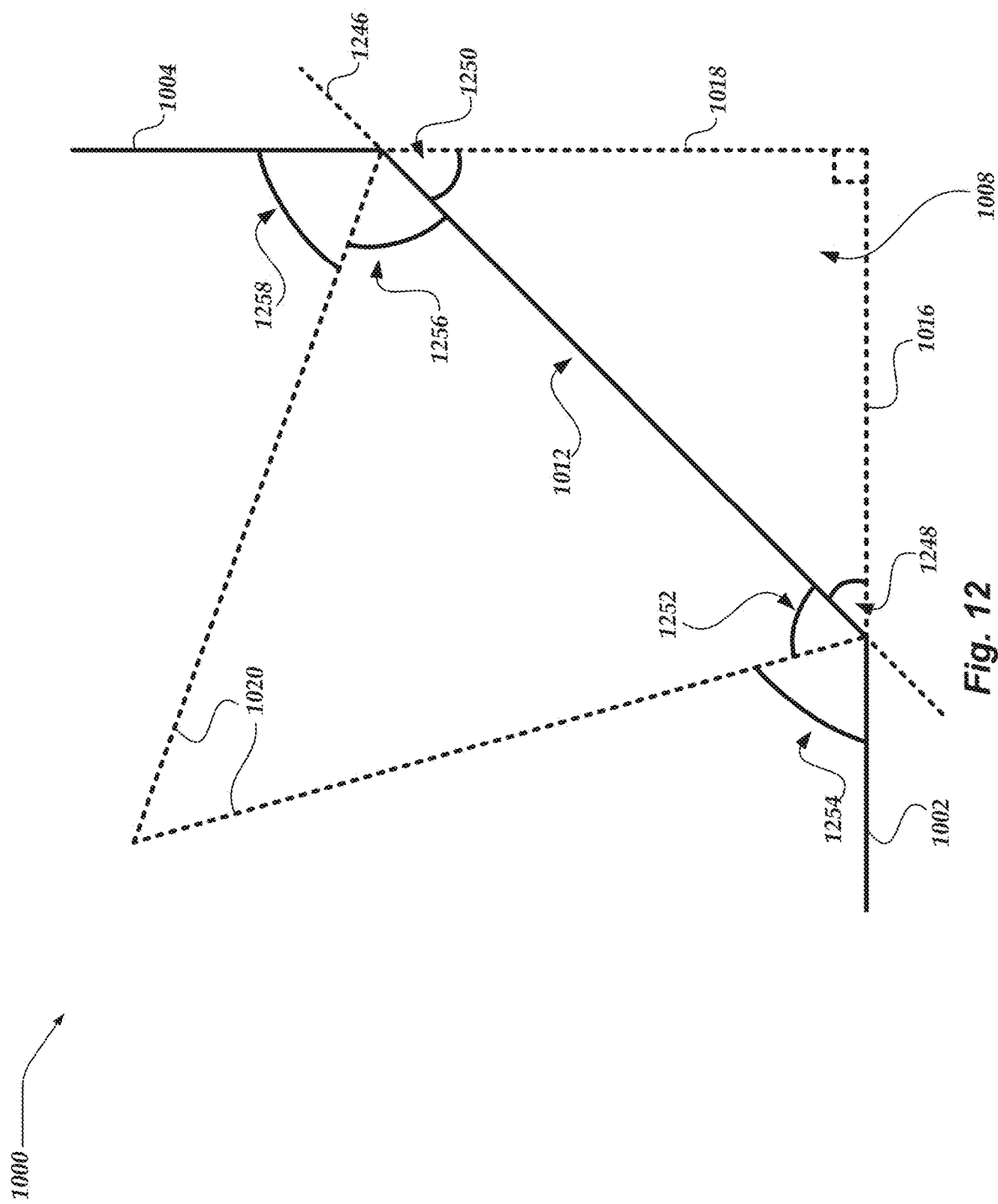
FIG. 12 is a top sectional view of a junction of a first panel portion and a second panel portion, with a chamfered transitional surface that extends from the first panel portion to the second panel portion.
Figure 13:
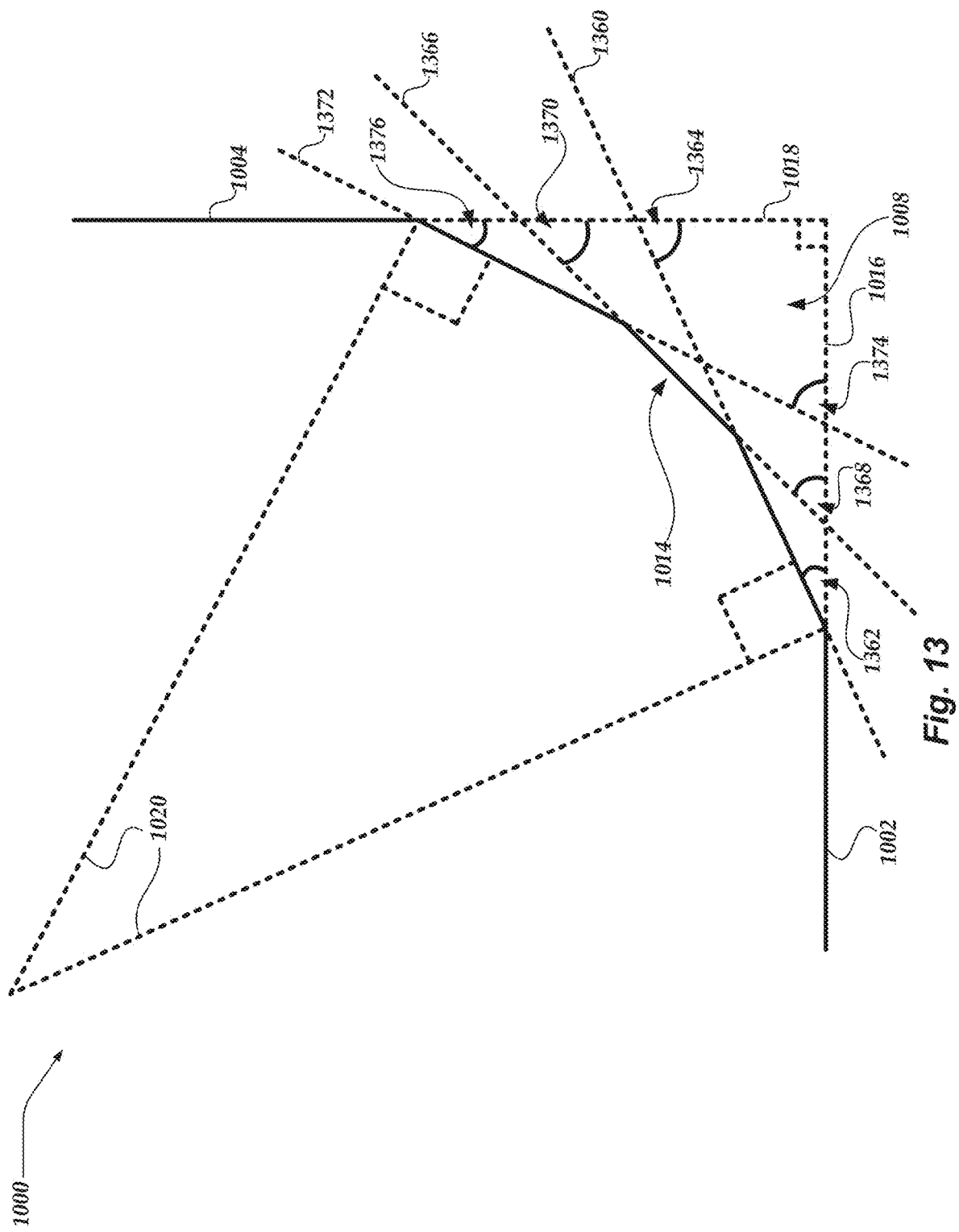
FIG. 13 is a top sectional view of a junction of a first panel portion and a second panel portion, with a multi-chamfered transitional surface that extends from the first panel portion to the second panel portion.

As used herein, the term "tangentially angled transitional surface" (or derivatives thereof, such as a transitional surface being tangentially angled or a transitional surface that is tangentially angled) refers to a transitional surface that, at each point along a length of the transitional surface, has a tangential angle that is greater than 0° and less than 90° to one or both of the plane in which the first surface lies or the plane in which the second surface lies, typically both (see, for example, FIGS. 11-13). Examples of tangentially angled transitional surfaces may include radiused corners, chamfered corners, or multi-faceted chamfered corners. As used herein, the term "tangentially angled transitional surface" (or derivatives thereof) refers to a transitional surface that is non-squared, is non-perpendicular to both the first surface of the panel 102 and the second surface of the panel 102, and does not include 90° edges.

In some examples, as seen in the sectional views of the partition 100 in FIGS. 7 and 8, one or more transitional portions of the panel 102 are tangentially angled. As used herein, the term "transitional panel portion" or derivatives thereof refers to a portion of a panel that extends from a first portion of the panel 102 to a second portion of the panel 102, with the second portion being perpendicular or nearly perpendicular (for example, within 30 degrees, or more preferably within 10 degrees, of perpendicular) to the first portion. Preferably, each transitional panel portion has two transitional surfaces, an inner transitional surface and an outer transitional surface that has a length that is longer than the length of the inner transitional surface. For example, the first panel portion may have a front surface and a rear surface while the second panel portion is disposed rearward of the first panel portion and has a left surface and a right surface, and the outer transitional surface may extend rearward from the front surface of the first panel portion to the left surface of the second panel portion while the inner transitional surface extends rearward from the rear surface of the first panel portion to the right surface of the second panel portion. Most preferably, the panel 102 has a transitional portion having an inner transitional surface and an outer transitional surface for each transitional surface of the panel 102 described herein.

FIGS. 10A-10D show a cross-sectional view of several examples of a junction 1000 of a first panel portion 1002 and a second panel portion 1004 that is perpendicular to the first panel portion 1002, with the cross-section being taken along a plane that is perpendicular to the first panel portion 1002 and to the second panel portion 1004. In FIG. 10A, the first panel portion 1002 and the second panel portion 1004 meet each other at a sharp edge 1006. In the example of FIG. 10A, the sharp edge 1006 together with the first panel portion 1002 and the second panel portion 1004 encompass a wedge-shaped volume 1008 (shown as a triangular shape in the sectional view). In contrast, FIGS. 10B-10D show examples of transitional surfaces that are tangentially angled so as to not encompass the wedge-shaped volume 1008 (or at least a majority of the wedge-shaped volume 1008), placing the wedge-shaped (or similarly shaped) volume 1008 at the outside of the panel transitional surface rather than on the interior of the corner joining the surfaces. In the example of FIG. 10B, the tangentially angled transitional surface is a radiused corner 1010. In the example of FIG. 10B, the tangentially angled transitional surface is a chamfered corner 1012. In the example of FIG. 10C, the tangentially angled transitional surface is a multi-faceted chamfered corner 1014. The volume 1008 outside of the panel transitional surface is defined by the panel transitional surface, the plane 1016 in which the first surface lies, and the plane 1018 in which the second surface lies.

Unlike the relatively sharp edge 1006, each tangentially angled transitional surface has an effective radius 1020 (which may be an actual radius, such as in the case of FIG. 10B). The effective radius 1020 is defined at two line segments that extend from a common point to each respective end of the length of a tangentially angled transitional surface. For radiused transitional surfaces or transitional surfaces with multi-faceted chamfers, the two line segments are perpendicular to the tangents of the tangentially angled transitional surface at the respective ends of the length in the plane along which the length of the tangentially angled transitional surface is measured (see FIGS. 11 and 13). In the example of the transitional surface with multiple chamfers, the distance from the common point to each end of each discrete chamfer segment of the transitional surface is preferably equal to the length of the effective radius.

For transitional surfaces with only a single chamfer, the two line segments extend at an angle from the respective ends of the length in the plane along which the length of the tangentially angled transitional surface is measured. The respective angles between the chamfered transitional surface and the two lines matches the respective angles between the two lines and the first surface and the second surface (see FIG. 12). In the example of the transitional surface with only a single chamfer, the distance from the common point to each point along the length of the transitional surface between the respective ends of the length of the transitional surface is less than the length of the effective radius (this may also be the case for each of the discrete chamfer segments of a transitional surface that has multiple chamfers).

The two line segments typically have equal lengths. The common point at which the two equal-length line segments meet is disposed opposite the tangentially angled transitional surface from the volume 1008. Most preferably, each of the two line segments of the effective radius 1020 of one or more of the tangentially angled transitional surfaces of the panel 102 has a length of at least one inch. In some preferred examples, each of the two line segments of the effective radius 1020 of one or more of the tangentially angled transitional surfaces of the panel 102 has a length of at least two inches. In some examples, each of the two line segments of the effective radius 1020 of one or more of the tangentially angled transitional surfaces of the panel 102 has a length of at least three inches.

FIG. 11 shows tangential angles at several points along a length of the tangentially angled transitional surface 1010 that is radiused. In the example of FIG. 11, a first tangent 1122 is a straight line that touches the tangential surface 1010 at only a single point 1124. Preferably, the first tangent 1122 has a non-zero acute angle 1126 to the plane 1016 in which the first surface 1002 generally lies. In some examples, the first tangent 1122 has a non-zero acute angle 1128 to the plane 1018 in which the second surface 1004 generally lies. In the example of FIG. 11, a second tangent 1130 is a straight line that touches the tangential surface 1010 at only a single point 1132. Preferably, the second tangent 1130 has an acute angle 1134 to the plane 1016 in which the first surface 1002 generally lies. In some examples, the second tangent 1130 has an acute angle 1136 to the plane 1018 in which the second surface 1004 generally lies. In the example of FIG. 11, a third tangent 1138 is a straight line that touches the tangential surface 1010 at only a single point 1140. Preferably, the third tangent 1138 has a non-zero acute angle 1142 to the plane 1016 in which the first surface 1002 generally lies. In some examples, the third tangent 1138 has a non-zero acute angle 1144 to the plane 1018 in which the second surface 1004 generally lies.

FIG. 12 shows the tangential angles at each point along a length of the tangentially angled transitional surface 1012 that is chamfered. In the example of FIG. 12, a tangent 1246 is a straight line that touches the tangential surface 1012 at each point along the length of the tangentially angled transitional surface 1012. Preferably, the tangent 1246 has a non-zero acute angle 1248 to the plane 1016 in which the first surface 1002 generally lies. In some examples, the tangent 1246 has a non-zero acute angle 1250 to the plane 1018 in which the second surface 1004 generally lies. Because the tangentially angled transitional surface 1012 has only a single chamfer, each line segment of the effective radius 1020 is angled relative to the transitional surface 1012. The angle of each line segment relative to the transitional surface 1012 is equal to the angle of the line segment relative to the panel portion that meets the corresponding end of the transitional surface 1012. For example, one of the line segments extends at an angle 1252 from the transitional surface 1012 at a point where the transitional surface 1012 meets the first panel portion 1002, and the angle 1252 is equal to an angle 1254 at which the line segment is oriented relative to the first panel portion 1002. As another example, the other of the two line segments extends at an angle 1256 from the transitional surface 1012 at a point where the transitional surface 1012 meets the second panel portion 1004, and the angle 1256 is equal to an angle 1258 at which the line segment is oriented relative to the second panel portion 1004.

FIG. 13 shows tangential angles at each point along a length of the tangentially angled transitional surface 1014 that has a multi-faceted chamfer. In the example of FIG. 13, a first tangent 1360 is a straight line that touches the tangential surface 1014 at each point along a segment of the tangential surface 1014. Preferably, the first tangent 1360 has a non-zero acute angle 1362 to the plane 1016 in which the first surface 1002 generally lies. In some examples, the first tangent 1360 has a non-zero acute angle 1364 to the plane 1018 in which the second surface 1004 generally lies. In the example of FIG. 13, a second tangent 1366 is a straight line that touches the tangential surface 1010 at each point along a segment of the tangential surface 1014. Preferably, the second tangent 1366 has an acute angle 1368 to the plane 1016 in which the first surface 1002 generally lies. In some examples, the second tangent 1366 has an acute angle 1370 to the plane 1018 in which the second surface 1004 generally lies. In the example of FIG. 13, a third tangent 1372 is a straight line that touches the tangential surface 1010 at each point along a segment of the tangential surface 1014. Preferably, the third tangent 1372 has a non-zero acute angle 1374 to the plane 1016 in which the first surface 1002 generally lies. In some examples, the third tangent 1372 has a non-zero acute angle 1376 to the plane 1018 in which the second surface 1004 generally lies.

One or more laterally inner transitional surfaces or laterally outer transitional surfaces of one or both of the driver-side portion 106 or the passenger-side portion 108 may be tangentially angled. One or more left transitional surfaces or right transitional surfaces of the gun well 110 may be tangentially angled. As shown in FIGS. 7 and 8, the laterally outer transitional surface 760 and the laterally inner transitional surface 762 of the passenger-side portion 108 are tangentially angled.

In the example illustrated in FIG. 7, the driver-side panel portion 114 is recessed from a lower panel portion 764a, and the passenger-side panel portion 118 is recessed from a lower panel portion 764b. In this example, the tangentially angled laterally outer transitional surface 760 of the passenger-side portion 108 extends toward the passenger-side channel 352b from a plane that extends through and parallel to the passenger-side lower panel portion 764b. In some examples, the rear end portion of the tangentially angled laterally outer transitional surface 760 of the passenger-side portion 108 terminates at a straight portion 766 that serves as a laterally inner wall of the passenger-side channel 352b. As shown in FIGS. 7 and 8, the tangentially angled laterally inner transitional surface 762 of the passenger-side portion 108 extends toward the gun well 110 from the plane that extends through and parallel to the passenger-side lower panel portion 764b. In this example, a laterally inner longitudinal panel portion 768 that is transverse to the passenger-side lower panel portion 764b separates the tangentially angled laterally inner transitional surface 762 of the passenger-side portion 108 and a tangentially angled left transitional surface 770 of the gun well 110. In some examples, the longitudinal panel portion 768 is oriented (in the longitudinal direction) perpendicular to or no greater than 7° from perpendicular to one or more of the driver-side lower panel portion 764a or the passenger-side lower panel portion 764b.

As shown in FIGS. 7 and 8, the right transitional surface 772 of the gun well 110 is tangentially angled and extends from the rear of the gun well toward the laterally inner transitional surface of the driver-side portion 106. In some examples, the rear portion of one or more of the tangentially angled left transitional surface 770 or the tangentially angled right transitional surface 772 of the gun well 110 terminates at a laterally outer bevel of a mounting surface, such as the laterally outer bevel 774a of the driver-side mounting surface 122a or the laterally outer bevel 774b of the passenger-side mounting surface 122b (see FIG. 8). In some examples, a lateral gun well panel portion 776 that is transverse to the longitudinal panel portion 768 separates the laterally outer bevel of one or more mounting surfaces and the rear portion of one or more of the tangentially angled left transitional surface 770 or the tangentially angled right transitional surface 772 of the gun well 110.

As shown in FIG. 8, the rear portion of one or more laterally outer corners, such as a laterally outer transitional surface 878 of the driver-side portion 106, terminates at a rear recess panel portion that serves as a rear wall of a channel, such as the driver-side rear recess panel portion 880a of the driver-side channel 352a or the passenger-side rear recess panel portion 880b of the passenger-side channel 352b. As also shown in FIG. 8, the rear portion of one or more laterally inner corners, such as a laterally inner transitional surface 882 of the driver-side portion 106, terminates at the front portion of one or more laterally outer corners of the gun well 110, such as the right transitional surface 772.

As shown in FIG. 8, the panel 102 may have one or more outwardly extending side flanges, such as the outwardly extending driver-side flange 884a or the outwardly extending passenger-side flange 884b, that extend forward and laterally outward from one or both of the laterally outer edges of the panel 102. In some examples, the driver-side panel 138a couples to the outwardly extending driver-side flange 884a, and the passenger-side panel 138b couples to the outwardly extending passenger-side flange 884b. As shown in FIGS. 1-4, 7, and 8, one or more of the shell 112 or the shell 116 may have one or more of a tangentially angled front transitional surface, a tangentially angled laterally inner transitional surface, or a tangentially angled laterally outer transitional surface that may extend from a top surface of the shell 112 or the shell 116 to the floor. In some examples, one or more of the transitional surfaces that laterally extend from the front edge and that longitudinally extend to the laterally inner or outer edge are tangentially angled.

As shown in FIG. 8, each tangentially angled transitional surface that is a radiused corner i) has a spline, elliptical, or curve shape (see, for example, FIG. 10B) and ii) is defined by a radius r and an angle α, which define the arc length of each radiused corner (arc length=$2*\pi*r*(\alpha/360)$, if α is given in degrees). In some examples, one or more of the tangentially angled transitional surfaces have a chamfer shape (see, for example, FIG. 10C) or a multi-faceted chamfer shape (see, for example, FIG. 10D) that generally follows one or more annotated curves illustrated in FIG. 8. In each case, the tangentially angled transitional surfaces produce a curvature rather than a sharp edge (see, in contrast, FIG. 10A). Accordingly, the tangentially angled transitional surfaces (especially radiused corners) prevent the prisoner from gripping the panel 102. Also accordingly, the tangentially angled transitional surfaces (especially radiused corners) increase the ease of cleaning the panel 102. Moreover, the tangentially angled transitional surfaces (especially radiused corners) facilitate providing increased structural integrity of the panel 102. Furthermore, the general curvature of each of the tangentially angled transitional surfaces (especially radiused corners) prevents unwanted thinning of material at the transitional surfaces when thermoforming the panel 102.

In other examples, one or more longitudinal portions of the panel 102 (for example, the straight portion 766, the longitudinal panel portion 768, or others) extend in the longitudinal direction at an angle that is obtuse to and, optionally, more than 7° from perpendicular to one or more of the driver-side lower panel portion 764a, the passenger-side lower panel portion 764b, or the rear wall of the gun well 110. Accordingly, at least compared to other partitions (for example, partitions that have a gun well with longitudinal walls that are perpendicular to the rear wall of the gun well or that have 90° sharp edges), the obtuse angles prevent the prisoner from gripping the panel 102 and increase the ease of cleaning the panel 102. In some examples, one or more longitudinal portions of the panel 102 (for example, the straight portion 766, the longitudinal panel portion 768, or others) extend in the longitudinal direction and meet one or more of the driver-side lower panel portion 764a, the passenger-side lower panel portion 764b, or the rear wall of the gun well 110 at a sharp edge (for example, a 90° edge or an edge that is within 7° of perpendicular).

As shown in FIG. 14, the passenger-side panel portion 118 generally lies in a first plane (represented by a line segment 1402 where the first plane intersects the section 7-7 of FIG. 1), and the recessed lateral wall of the gun well 110 generally lies in a second plane (represented by a line segment 1404 where the second plane intersects the section 7-7 of FIG. 1). The transitional surface 762 extends toward the gun well 110 from the line segment 1402. The transitional surface 770 extends toward the passenger-side panel portion 118 from the line segment 1404. In the example shown in FIG. 14, the rear end of the transitional surface 762 and the front end of the transitional surface 770 terminate at opposite ends of the laterally inner longitudinal panel portion 768, which generally lies in a third plane (represented by a line segment 1406 where the third plane intersects the section 7-7 of FIG. 1). In other examples, the rear end of the transitional surface 762 meets the front end of the transitional surface 770, and the third plane intersects the inflection point between the transitional surface 762 and the transitional surface 770. In these other examples, the third plane is typically oriented perpendicular to one or both of the first plane or the second plane.

Figure 9:
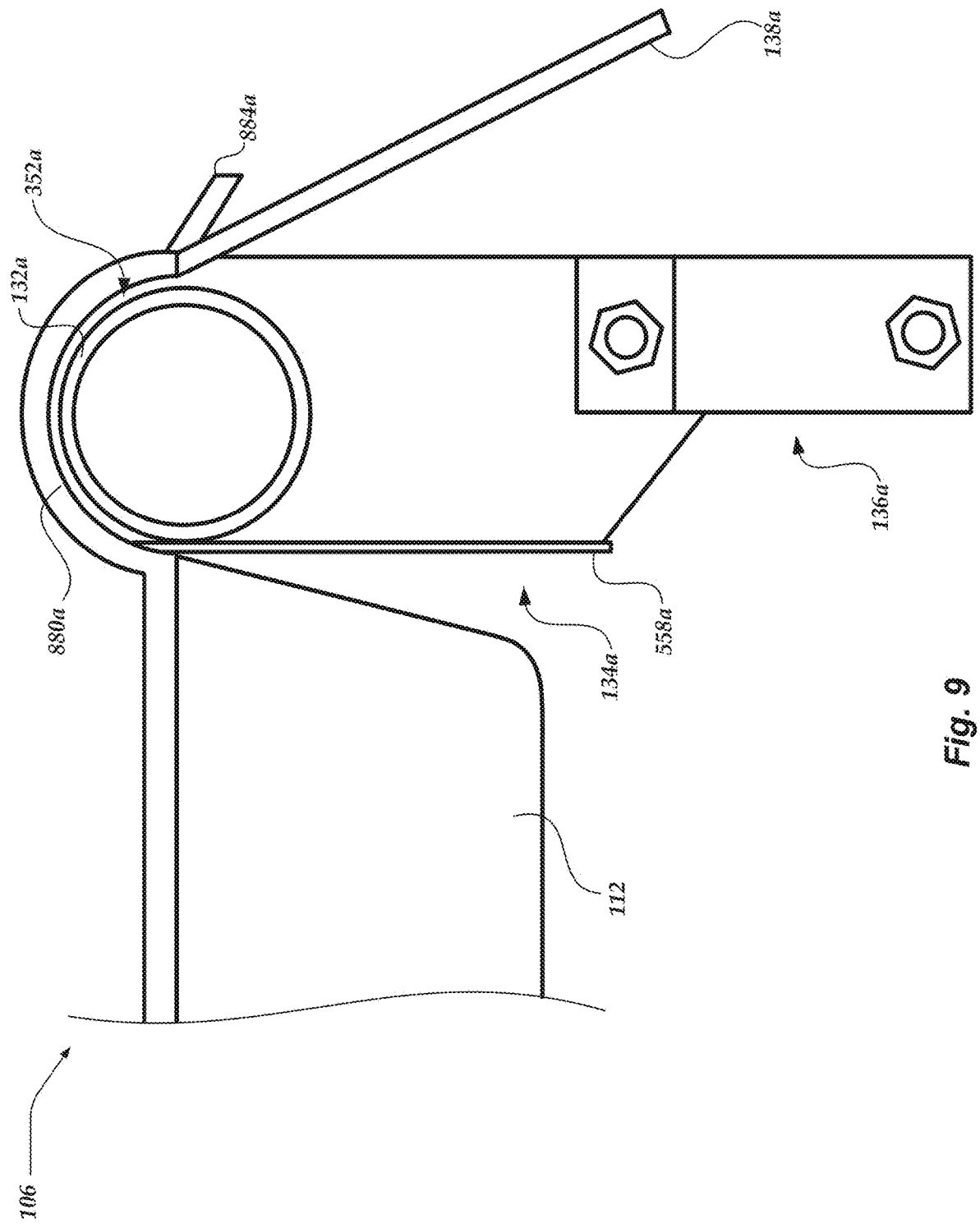
FIG. 9 is a top sectional view of a portion of a partition, showing a round side frame member and a round recess in a panel of the partition to accommodate the round frame member.

As shown in FIG. 14, each of the transitional surface 762 and the transitional surface 770 is tangentially angled and, thus, has an effective radius er. The effective radius er of each of the transitional surface 762 and the transitional surface 770 is shown at two line segments that meet at an angle α, which together with the lengths of the line segments define the effective arc length of each tangentially angled transitional surface. In some examples, the top frame 126 and the side frame members (for example, the driver-side frame member 132a or the passenger-side frame member 132b) include square or rectangular tubes. In the example shown in FIG. 8, the channels (for example, the driver-side channel 352a or the passenger-side panel 352b) are squared to accommodate the squared side frame members. Providing square or rectangular channels facilitates simplifying installation by providing flat mounting or drilling surfaces and allows the use of fasteners in contrast to the welding of the prior art systems. The square or rectangular tubes facilitate providing a lighter-weight frame 104 for a given amount of structural strength than other partitions. The square or rectangular tubes provide flat mounting surfaces that facilitate easy attachment of accessories, such as lights, cameras, or others. In other examples, one or more of the top frame 126, the driver-side frame member 132a, or the passenger-side frame member 132b include round tubes. In these examples shown, the channels (for example, the driver-side channel 352a or the passenger-side panel 352b) are round to accommodate the round side frame members (see FIG. 9, showing an example of the driver-side channel 352a being round to accommodate a round version of the driver-side frame member 132a).

In some examples, one or both of front side or the rear side of the panel 102 has an elastomeric coating, such as a polyurethane coating, a polyurea coating, or others. The coating facilitates reducing the amount of noise that passes through the partition 100 compared to other partitions. The coating also facilitates increasing the variety of chemicals to which the panel 102 is resistant. Moreover, the coating facilitates increasing the range of temperatures in which the panel 102 maintains its strength. The coating further facilitates increasing the abrasion resistance of the panel 102.

The terms "front," forward," "rear," "rearward," "behind," "backward," and the like are used consistently with respect to all elements of the partition 100 and the vehicle in which the partition 100 is or will be installed. The terms "front," forward," "rear," "rearward," "behind," "backward," and the like are defined relative to the direction that the driver typically faces when driving straight along a freeway, which is the forward direction. The terms "left," "right," and the like are used consistently with respect to all elements of the partition 100 and the vehicle in which the partition 100 is or will be installed. The terms "left," "right," and the like are defined relative to the partition 100 when facing the front face of the partition 100, which is shown in FIG. 1. The terms "longitudinal," "lateral," "up," "down," and the like are used consistently with respect to all elements of the partition 100 and the vehicle in which the partition 100 is or will be installed. The terms "longitudinal," "lateral," "up," "down," and the like are defined relative to the bottom bar 130 of the top frame 126, which extends in a lateral direction that is transverse to the longitudinal direction. The term "longitudinal" references, for example, the direction along which the plates 134a, 134b extend. The terms "up," "down," and the like reference a direction that is transverse to the lateral direction and the longitudinal direction.

While the preferred embodiment of the invention has been illustrated and described, as noted above, many changes can be made without departing from the spirit and scope of the invention. For example, any other suitable combination of the materials, versions, dimensions, or the like, such as those discussed herein, may be employed. Accordingly, the scope of the invention is not limited by the disclosure of the The embodiments of the invention in which an exclusive property or privilege is claimed are defined as follows:

1. A partition configured to separate a rearward portion of a vehicle from a forward portion of the vehicle, the partition comprising:
   a thermoformed panel having a front side, a rear side, a driver-side portion, a passenger-side portion, and a gun well positioned between the driver-side portion and the passenger-side portion, the gun well being recessed toward the rear side of the thermoformed panel;
   the driver-side portion being sized and dimensioned to extend along a majority of a vertical height of a driver-side seat of the vehicle;
   the driver-side portion being formed with a driver-side seatback transitional surface transitioning from the driver-side portion toward the gun well, the driver-side seatback transitional surface being tangentially angled and non-squared; and
   the passenger-side portion being formed with a passenger-side seatback transitional surface transitioning from the passenger-side portion toward the gun well, the passenger-side seatback transitional surface being tangentially angled and non-squared.

2. The partition of claim 1, wherein the thermoformed panel has only one molded sheet.

3. The partition of claim 1, wherein the gun well is formed with a driver-side gun-well transitional surface transitioning from the gun well toward the driver-side portion, the driver-side gun-well transitional surface being tangentially angled and non-squared.

4. The partition of claim 1, wherein the gun well is formed with a passenger-side gun-well transitional surface transitioning from the gun well to the passenger-side portion, the passenger-side gun-well transitional surface being tangentially angled and non-squared.

5. The partition of claim 1, the gun well has one or more mounting surfaces configured to receive one or more accessories.

6. The partition of claim 1, further comprising a top frame disposed above the thermoformed panel, the thermoformed panel having a lateral width, the top frame extending along the lateral width of the thermoformed panel, and the thermoformed panel extending from a floor of the vehicle to the top frame.

7. The partition of claim 1, wherein one or more of the driver-side seatback transitional surface or the passenger-side seatback transitional surface has a chamfer.

8. The partition of claim 1, wherein one or more of the driver-side seatback transitional surface or the passenger-side seatback transitional surface has a multi-faceted chamfer.

9. The partition of claim 1, wherein one or more of the driver-side seatback transitional surface or the passenger-side seatback transitional surface is radiused.

10. The partition of claim 1, wherein the driver-side portion and the passenger-side portion extend forward relative to the gun well by different longitudinal distances.

11. A partition configured to separate a rearward portion of a vehicle from a forward portion of the vehicle, the partition comprising:
    a thermoformed panel having a front side, a rear side, a driver-side portion, a passenger-side portion, and a gun well disposed between the driver-side portion and the passenger-side portion, the gun well being recessed toward the rear side of the thermoformed panel;
    the driver-side portion being sized and dimensioned to extend along a majority of a vertical height of a driver-side seat of the vehicle; and
    the gun well being formed with a driver-side gun-well transitional surface transitioning from the gun well toward the driver-side portion and being formed with a passenger-side gun-well transitional surface transitioning from the gun well toward the passenger-side portion, the driver-side gun-well transitional surface being tangentially angled and non-squared, and the passenger-side gun-well transitional surface being tangentially angled and non-squared.

12. The partition of claim 11, wherein the thermoformed panel has only one molded sheet.

13. The partition of claim 11, wherein the driver-side portion is formed with a driver-side seatback transitional surface transitioning from the driver-side portion toward the gun well, the driver-side seatback transitional surface being tangentially angled and non-squared.

14. The partition of claim 11, wherein the passenger-side portion is formed with a passenger-side seatback transitional surface transitioning from the passenger-side portion toward the gun well, the passenger-side seatback transitional surface being tangentially angled and non-squared.

15. The partition of claim 11, wherein the gun well has one or more mounting surfaces configured to receive one or more accessories.

16. The partition of claim 11, further comprising a top frame disposed above the thermoformed panel, the thermoformed panel having a lateral width, the top frame extending along the lateral width of the thermoformed panel, and the thermoformed panel extending from a floor of the vehicle to the top frame.

17. The partition of claim 11, wherein one or more of the driver-side gun-well transitional surface or the passenger-side gun-well transitional surface has a chamfer.

18. The partition of claim 1, wherein one or more of the driver-side gun-well transitional surface or the passenger-side gun-well transitional surface has a multi-faceted chamfer.

19. The partition of claim 1, wherein one or more of the driver-side gun-well transitional surface or the passenger-side gun-well transitional surface is radiused.

20. The partition of claim 11, wherein the driver-side portion and the passenger-side portion extend forward relative to the gun well by different longitudinal distances.

* * * * *